(12) United States Patent
Feitz et al.

(10) Patent No.: US 7,674,526 B2
(45) Date of Patent: Mar. 9, 2010

(54) PROCESS FOR PRODUCING A NANOSCALE ZERO-VALENT METAL

(75) Inventors: Andrew Feitz, Sydney (AU); Jing Guan, Sydney (AU); David Waite, Sydney (AU)

(73) Assignee: CRC for Waste Management and Pollution Control, Limited, Eveleigh, New South Wales (AU)

( * ) Notice: Subject to any disclaimer, the term of this patent is extended or adjusted under 35 U.S.C. 154(b) by 1039 days.

(21) Appl. No.: 11/289,939

(22) Filed: Nov. 29, 2005

(65) Prior Publication Data

US 2006/0083924 A1   Apr. 20, 2006

Related U.S. Application Data

(63) Continuation-in-part of application No. PCT/AU2004/000695, filed on May 26, 2004.

(30) Foreign Application Priority Data

May 29, 2003   (AU) .............................. 2003902704

(51) Int. Cl.
*B32B 5/16* (2006.01)

(52) U.S. Cl. ....................... 428/403; 428/404; 428/405; 428/406; 427/212

(58) Field of Classification Search ......... 428/403–406, 428/212
See application file for complete search history.

(56) References Cited

U.S. PATENT DOCUMENTS

| 4,136,059 A | | 1/1979 | Jalan et al. |
| 5,122,279 A | * | 6/1992 | Guess ........................ 210/717 |
| 5,976,383 A | | 11/1999 | Guess et al. |

* cited by examiner

*Primary Examiner*—Kiliman Leszek
(74) *Attorney, Agent, or Firm*—David W. Maher; TechLaw LLP

(57) ABSTRACT

This invention describes a process for producing a nanoscale zero-valent metal, including reduction of a metal ion solution with a dithionite compound, wherein the reduction is carried out under alkaline conditions under substantially an inert atmosphere. A nanoscale zero-valent metal obtainable by this process, and having a new crystalline form, is also described. The nanoscale zero-valent metal produced by the process of the invention is preferably iron, and is advantageously used for the remediation of contaminated water.

32 Claims, 15 Drawing Sheets

*Figure 9*

| Compound | Unit | Value | Major elemental contribution (g/g oxidized sample)* |
|---|---|---|---|
| Na$_2$O | % | 0.82 | 0.006 |
| MgO | % | 0.13 | |
| Al$_2$O$_3$ | % | 0.53 | |
| SiO$_2$ | % | 0.55 | |
| P$_2$O$_5$ | % | 0.048 | |
| SO$_3$ | % | 32.483 | 0.128 |
| K$_2$O | % | 0.091 | |
| CaO | % | 0.34 | |
| TiO$_2$ | % | 0.017 | |
| V$_2$O$_5$ | % | -0.004 | |
| Cr$_2$O$_5$ | % | -0.009 | |
| MnO | % | 0.122 | |
| Fe$_2$O$_3$ | % | 59.56 | 0.413 |
| NiO | % | 0.013 | |
| CuO | % | -0.021 | |
| ZnO | % | -0.013 | |
| As$_2$O$_3$ | % | -0.010 | |
| Rb$_2$O | % | -0.025 | |
| SrO | % | -0.010 | |
| Y$_2$O$_3$ | % | 0.004 | |
| ZrO$_2$ | % | 0.000 | |
| BaO | % | -0.008 | |
| CeO$_2$ | % | -0.033 | |
| PbO | % | 0.007 | |
| ThO$_2$ | % | -0.079 | |
| U$_3$O$_8$ | % | 0.003 | |
| Total | % | 94.5 | |
| Loss on Ignition | % | 5.5 | |

*note XRF analysis does not include elements O, H or C

PROCESS FOR PRODUCING A NANOSCALE ZERO-VALENT METAL

CROSS REFERENCE TO RELATED APPLICATIONS

This application is a continuation-in-part of International Application PCT/AU2004/000695, with an international filing date of May 26, 2004, which claims priority to Australian Patent Application Number 2003902704, filed May 29, 2003. This application claims the benefit of each priority application, each of which are incorporated by reference.

FIELD OF THE INVENTION

This invention relates to a process for preparing nanoscale zero-valent metals, which are suitable for a wide variety of applications, including but not limited to the remediation of water contaminated with organic contaminants. More particularly, this invention relates to a process for preparing nanoscale zero-valent iron.

BACKGROUND OF THE INVENTION

Any discussion of the prior art throughout the specification should in no way be considered as an admission that such prior art is widely known or forms part of common general knowledge in the field.

Disposal of industrial chemicals is a problem on a worldwide scale. Traditionally, toxic chemicals, such as halogenated organic compounds (HOCs) were disposed of by burying containers in the ground or simply dumping liquids onto the ground. However, these methods of disposal are unsatisfactory; buried containers sometimes degrade, leaking their contents into the environment, and liquids dumped on the ground tend to seep into the soil, eventually finding their way into water systems, thereby to contaminate the environment and domestic water supplies. This is especially undesirable in the case of harmful and/or toxic chemicals.

Recently, there have been attempts to deal with harmful waste chemicals, such as HOCs, by transforming them into less harmful products using a suitable reductive process (Chuan-Bao Wang et al., *Environmental Science & Technology*, 1997, vol. 31, no. 7, 2154-2156; U.S. Pat. No. 5,857,810). Destruction of HOCs by zero-valent metals, particularly iron, represents an excellent technology for environmental remediation (P. G. Tratnyek, *Chem. Ind.*, 1996, 13, 499-503). It has been shown that granular iron can degrade many HOCs, including chlorinated aliphatics (R. W. Gillham et al., *Ground Water*, 1994, 32, 958-967), chlorinated aromatics (C. B. Wang et al., *Proceeding of the 15th Meeting of North American Catalysis Society*, Chicago, May 18-23, 1997) and polychlorinated biphenyls (F. W. Chuang et al., *Environ. Sci. Technol.*, 1995, 29, 2460-2463), as well as nitroaromatic compounds.

The use of granular iron has, however, been problematic because of the relatively low reactivity of iron granules. To circumvent this problem, nanoscale zero-valent iron (ZVI) has been used as an efficient means for remediation of contaminated water (Chuan-Bao Wang et al., *Environmental Science & Technology*, 1997, vol. 31, no. 7, 2154-2156; U.S. Pat. No. 5,857,810). Nanoscale ZVI is more reactive than granular ZVI because of its high surface area to volume ratio. Typically, a colloidal suspension of nanoscale ZVI is contacted with water contaminated with HOCs (see, for example, D. W. Elliott, *Environ. Sci. Technol.*, 2001, 35, 4922-4926). The nanoscale ZVI may be added in slurry reactors for the treatment of contaminated soil and sediment, or injected into contaminated groundwater under gravity-feed conditions. An advantage of colloidal suspensions of nanoscale ZVI is that the nanoparticles can "flow" to some extent with groundwater, reaching areas of contamination inaccessible by conventional methods. Alternatively, the nanoscale ZVI may be anchored onto granular activated carbon and other media.

Unlike granular ZVI, nanoscale ZVI is not commercially available. Generally, it is synthesized by reduction of an aqueous solution of ferric iron ($Fe^{3+}$) using sodium borohydride. This produces nanoscale ZVI having a primary particle size of 1-200 nm. The nanoscale ZVI made by this procedure may, optionally, be coated with a layer of Pd by further reaction with an ethanolic solution of $[Pd(C_2H_3O_2)_2]_3$ (Chuan-Bao Wang et al., *Environmental Science & Technology*, 1997, vol. 31, no. 7, 2154-2156). Nanoscale ZVI coated with Pd has also been shown to be an effective means for remediation of contaminated materials.

Other nanoscale zero-valent metals are potentially useful in other applications. For instance, nanoscale zero-valent phosphorus has potential applications in the semiconductor industry.

A disadvantage of preparing nanoscale ZVI by sodium borohydride reduction is the cost of sodium borohydride. Commercial grade sodium borohydride costs about $90/kg. Moreover, there are only a few places in the world that manufacture sodium borohydride. Consequently, the cost of nanoscale ZVI is relatively high, in some cases, too high to be commercially viable.

A further disadvantage of using borohydride to produce zero-valent metals is that borohydride is relatively unstable, meaning that its production, transport and usage require careful control, and thereby further expense.

A further disadvantage of the borohydride reduction method is that it produces large quantities of explosive hydrogen gas. Notwithstanding the inherent hazards of hydrogen gas, the additional safety protocols required for dealing with the gas on a large scale contribute to the high cost of presently available nanoscale ZVI.

A reductant thus circumventing the above-mentioned limitations would seem preferable. The reduction of Fe(III) ions to Fe(II) ions using dithionite anion is known. However, the reaction product $Fe^{2+}$ has a lower redox potential than ZVI, and is limited to chemistry in solution.

It is an object of the present invention to overcome or ameliorate at least one of the disadvantages of the prior art, or to provide a useful alternative.

SUMMARY OF THE INVENTION

According to a first aspect, the present invention provides a process for producing a nanoscale zero-valent metal including reduction of a metal ion solution with a dithionite compound, wherein said reduction is carried out under alkaline conditions and under a substantially inert atmosphere.

Preferably, the metal ion is iron, nickel, zinc, tin, copper, silver, gold, lead, cadmium, mercury, cobalt, molybdenum, chromium, platinum, palladium or phosphorus. More preferably, the metal ion is iron, copper, gold, platinum, palladium or silver. More preferably still, the metal ion is iron. Preferably, the metal ion is phosphorus.

Preferably, the iron solution is a ferrous solution. Preferably, the ferrous solution is an aqueous solution. Preferably, the ferrous solution is an aqueous solution of $FeSO_4$, $FeCl_2$, $FeBr_2$, $FeI_2$, $Fe(NO_3)_2$, $FeCO_3$, $Fe_3(PO_4)_2$ or mixtures thereof. More preferably, the ferrous solution is an aqueous solution of $FeSO_4$ or $FeCl_2$.

Preferably, the dithionite compound is a metal salt of dithionite. More preferably, the dithionite compound is a compound selected from $Na_2S_2O_4$, $Li_2S_2O_4$, $K_2S_2O_4$, $MgS_2O_4$ or $CaS_2O_4$. More preferably still, the dithionite compound is $Na_2S_2O_4$.

Preferably, the metal ion solution has a pH in the range of 9 to 12. More preferably, the metal ion solution has a pH of about 10.

Preferably, the alkaline conditions are provided by including a hydroxide compound in the metal ion solution. More preferably, the hydroxide compound is selected from LiOH, NaOH, KOH, $Mg(OH)_2$ or $Ca(OH)_2$. More preferably still, the hydroxide compound is NaOH.

Preferably, the process is carried out under a substantially inert atmosphere. More preferably, the inert atmosphere is provided by nitrogen or argon.

According to another aspect, the present invention provides a nanoscale zero-valent metal obtainable by a process as described above.

According to further aspect, the present invention provides a nanoscale zero-valent metal prepared by a process as described above Preferably, the nanoscale zero-valent metal is nanoscale zero-valent iron (ZVI). Preferably, the nanoscale zero-valent metal has an average primary particle size of 0.5 to 3000 nm, more preferably 1 to 3000 nm. Preferably, the nanoscale zero-valent metal has an average aggregate particle size of 0.1 to 100 μm.

According to yet another aspect, the present invention provides a zero-valent metal including nanoscale particles of crystalline platelets, each crystalline platelet including the zero-valent metal. Preferably, the crystalline platelets include metal particles imbedded in a sulfite hydrate crystal matrix. Preferably, the zero-valent metal is iron. Preferably, the nanoscale particles of crystalline platelets have an average primary particle size in the range of 0.5 to 3000 nm, more preferably 1 to 3000 nm. Preferably, the zero-valent metal is coated with a layer of palladium or platinum.

According to yet another aspect, the present invention provides a process for treating a material contaminated with an organic contaminant, the process including the step of contacting the material with a zero-valent metal according to any one of the preceding claims. Preferably, the organic contaminant is a halogenated organic compound (HOC) or a nitroaromatic compound. Preferably, the zero-valent metal is in the form of a colloidal suspension. Preferably, the contaminated material is contaminated water.

Nanoscale zero-valent metals, such as zero-valent iron (ZVI), prepared according to the present invention are suitable for use in processes for the remediation of contaminated materials, such as contaminated water. Advantageously, nanoscale ZVI prepared by the process of the present invention is significantly cheaper than nanoscale ZVI prepared by known methods. Due to the low cost of, for example, technical grade sodium dithionite ($2.15/kg), the cost of nanoscale ZVI prepared by the process of the present invention is about $9/kg, based on reagent cost alone. By contrast, nanoscale ZVI prepared by borohydride reduction costs about $66/kg.

A further advantage of the present invention is that dithionites are generally stable compounds, which do not require any special safety protocols for their transport and production. This is especially true when dithionites are compared with the relatively unstable borohydrides used in the prior art.

Yet a further advantage of the present invention is that dithionite reduction of metal ion does not produce explosive hydrogen gas. Aside from the obvious benefits of avoiding the production of explosive gases, the present invention has the further advantage that costly safety protocols, which must be observed when generating hydrogen gas, are obviated. Thus, the present invention provides significant advantages over the methods known in the prior art.

A further advantage still of the present invention is that it is both reproducible and scalable; the laboratory-scale experimental process is thereby applicable to industrial-scale zero-valent nanoscale metal production. Other uses of zero-valent nanoscale metals include sunscreens, catalysis, or nucleation centres for bioremediation.

The present invention is also effective using a mixture of metal ions, a mixture of counter-ions, a mixture of both metal ions and counter-ions and/or a mixture of reducing species.

PREFERRED FEATURES OF THE INVENTION

The present invention provides a process for producing nanoscale particles of a zero-valent metal from a metal ion solution. As used herein, the term "zero-valent metal" means any composition, mixture or coated product which includes a zero-valent metal, as well as meaning a zero-valent metal in its pure form.

The invention is applicable to any kind of metal ion solution, provided that the metal ion has a reduction potential greater (i.e. more positive) than the reduction of potential for water, i.e.

| | $E_H$/V |
|---|---|
| $2H_2O + 2e = H_2 + 2OH^-$ | −0.8227 |

Accordingly, the process of the present invention may be used to produce, for example, nanoscale zero-valent iron, nickel, zinc, tin, copper, silver, gold, lead, cadmium, mercury, cobalt, molybdenum, chromium, platinum, palladium or phosphorus. Preferably, the metal ion solution is an iron, copper, gold, platinum, palladium or silver solution and the process of the invention is used to prepare nanoscale zero-valent iron (ZVI), copper or silver, respectively. More preferably, the metal ion solution is an iron solution and the process is used to prepare nanoscale zero-valent iron (ZVI). Preferably, the metal ion solution is a ferrous ($Fe^{2+}$) solution. Ferric ion ($Fe^{3+}$) may also be used if desired. Preferably, the process of the present invention is carried out in the absence of other metals i.e. with only one type of metal present in solution. In some cases it may be preferable to use metals in solution at their lower redox state (e.g. $Fe^{2+}$ than $Fe^{3+}$, $Ag^+$ than $Ag^{2+}$).

In a preferred embodiment, the process of the present invention is carried out by adding a ferrous solution to a dithionite solution, although the reverse addition may also be used if appropriate. Preferably, the ferrous and dithionite solutions are aqueous solutions, although non-aqueous solutions are also contemplated within the scope of this invention. Moreover, the term "solution" is intended to cover any type of solution, including dispersions, suspensions and emulsions, as well as solutions in the usual sense.

In a preferred embodiment, the ferrous solution may be an aqueous solution of $FeSO_4$, $FeCl_2$, $FeBr_2$, $FeI_2$, $Fe(NO_3)_2$, $FeCO_3$, $Fe_3(PO_4)_2$ or mixtures thereof. Preferably, the ferrous solution is an aqueous solution of $FeSO_4$ or $FeCl_2$. More preferably, the ferrous solution is an aqueous solution of $FeCl_2$. Solutions of these iron compounds have been shown to be particularly effective when used in the process of the present invention.

Preferably, the dithionite compound is a metal salt of dithionite. More preferably, the diothionite compound is selected from $Na_2S_2O_4$, $Li_2S_2O_4$, $K_2S_2O_4$, $MgS_2O_4$ or $CaS_2O_4$. More preferably, the diothionite compound is $Na_2S_2O_4$, which is commonly available at relatively low cost.

The process of the present invention is carried out under alkaline conditions, typically at a pH in the range of 8 to 12, preferably 9 to 11. In a preferred embodiment, the pH of the solution is about 10. Preferably, the alkaline conditions are provided by including a hydroxide compound in the solution, such as LiOH, NaOH, KOH, $Mg(OH)_2$ or $Ca(OH)_2$, more preferably NaOH. Hence, with hydroxide ions present, the reductive process of the present invention may be represented by the following two half redox equations:

|  | $E_H/V$ |
|---|---|
| $S_2O_4^{2-} + 4OH^- \rightarrow 2SO_3^{2-} + 2H_2O + 2e^-$ | +1.12 |
| $Fe^{2+} + 2e^- \rightarrow Fe(s)$ | −0.44 |
| $\Rightarrow S_2O_4^{2-} + Fe^{2+} + 4OH^- \rightarrow Fe(s) + 2SO_3^{2-} + 2H_2O$ | +0.68 |

Alternatively, alkaline conditions may be achieved using other basic reagents, such as ammonia.

Preferably, the process of the present invention is carried out under a substantially inert atmosphere. An inert atmosphere is preferably achieved by carrying out the process under an atmosphere of an inert gas, preferably nitrogen or argon.

It is preferable that oxygen is excluded or substantially excluded from the atmosphere. Preferably, the process is conducted in a concentration of carbon dioxide which is substantially less than the normal atmospheric concentration. More preferably, the concentration of carbon dioxide should be less than about 200 ppm, more preferably, less than about 100 ppm, more preferably less than about 50 ppm, more preferably less than about 10 ppm, more preferably less than about 5 ppm, and more preferably less than about 1 ppm.

In a further aspect of the present invention, there is provided a nanoscale zero-valent metal obtainable by a process as described above.

In yet a further aspect of the present invention, there is provided a nanoscale zero-valent metal prepared by a process as described above.

The nanoscale zero-valent metal is preferably iron, copper, gold, platinum, palladium or silver, more preferably iron, and will be typically in the form of aggregates of primary particles. Preferably, the average aggregate (secondary) particle size is in the range of 0.1 to 100 μm, more preferably, 0.2 to 50 μm, more preferably 0.3 to 30 μm, and more preferably still 0.5-20 μm.

Preferably, the average primary particle size is in the range of 0.5 to 3000 nm, more preferably 5 to 2000 nm, more preferably 10 to 1500 nm, more preferably 50 to 1200 nm and more preferably still 100 to 800 nm. Nanoscale metal particles having aggregate and primary particle sizes in these preferred ranges are found to be particularly effective for the remediation of water.

In a further aspect of the present invention, there is provided a zero-valent metal including nanoscale particles of crystalline platelets, each crystalline platelet including the zero-valent metal. Preferably, the crystalline platelets include metal particles (preferably iron) imbedded in a sulfite hydrate crystal matrix. Preferably, the primary particles of crystalline platelets have an average particle size in the range of 0.5 to 3000 nm, more preferably 5 to 2000 nm, more preferably 10 to 1500 nm, more preferably 50 to 1200 nm and more preferably still 100 to 800 nm.

The present invention also provides a zero-valent valent metal as described above, which is coated with a layer of palladium or platinum. The coated metal may be formed by reaction with an ethanolic solution of $[Pd(C_2H_3O_2)_2]_3$, as described in Chuan-Bao Wang et al., *Environmental Science & Technology*, 1997, vol. 31, no. 7, 2154-2156.

Nanoscale zero-valent iron as described above may be used in a process for remediation of water. Accordingly, in a further aspect of the present invention, there is provided a process for treating a material contaminated with an organic contaminant, said process including the step of contacting the material with a nanoscale zero-valent metal as described above; preferably, the metal is iron. Typical processes of this type are described in the prior art: Chuan-Bao Wang et al., *Environmental Science & Technology*, 1997, vol. 31, no. 7, 2154-2156; U.S. Pat. No. 5,857,810; D. W. Elliott, *Environ. Sci. Technol.*, 2001, 35, 4922-4926; R. W. Gillham et al., *Ground Water*, 1994, 32, 958-967; C. B. Wang et al., *Proceeding of the 15th Meeting of North American Catalysis Society*, Chicago, May 18-23, 1997; and F. W. Chuang et al., *Environ. Sci. Technol.*, 1995, 29, 2460-2463, all of which are incorporated herein by reference.

Preferably, the organic contaminant is a halogenated organic compound (HOC), such as chlorinated aliphatics, chlorinated aromatics and/or polychlorinated biphenyls, or a nitroaromatic compound. Preferably, the contaminated material is water.

Preferably, the nanoscale zero-valent metal is used in the form of a dispersion, more preferably a stable dispersion, more preferably still, a colloidal suspension. In this form, the metal can "flow", thereby reaching areas of contamination inaccessible by conventional methods. Colloidal suspensions, and other forms of nanoscale zero-valent iron suitable for use in the remediation of water, are described in the above-mentioned prior art documents.

Nanoscale zero-valent phosphorus, prepared as described above may be used in the semiconductor industry.

The invention will now be described in more detail with reference to the following Examples. However, it will be appreciated that the Examples describe preferred embodiments of the present invention and that modifications of detail may be made within the scope of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

BRIEF DESCRIPTION OF THE DRAWINGS

A preferred embodiment of the invention will now be described, by way of example only, with reference to the accompanying drawings in which:

FIG. 9 shows X-ray fluorescence (XRF) analysis of sample 1A produced from $FeCl_2$ and sodium dithionite. The elemental analysis indicates that the bulk sample Fe:S ratio is approximately 3:1.

DETAILED DESCRIPTION OF A PREFERRED EMBODIMENT

Comparative Example 1

Prior Art Method for ZVI Synthesis Using Sodium Borohydride and Ferric Chloride

Nanoscale ZVI particles were produced by adding 0.16 M $NaBH_4$ (98%, Aldrich) in 0.1 M NaOH solution dropwise to a 0.1 M $FeCl_3 \cdot 6H_2O$ (98%, Aldrich) aqueous solution at ambient temperature with magnetic stirring. $Fe^{3+}$ is reduced and precipitated according to the following reaction:

$$Fe(H_2O)_6^{3+} + 3BH_4^- + 3H_2O \rightarrow Fe + 3B(OH)_3 + 10.5H_2$$

Metal particles were obtained by washing the wet precipitates with $10^{-4}$ M HCl 3-4 times and storing in $10^{-4}$ M HCl at a concentration of 200 mg Fe/mL. For dry particle characterisation, the particle suspension was dried at 60° C. under $N_2$ gas or freeze-dried under vacuum. Drying under air resulted in the colour of Fe particles changing from black to reddish-brown within a few hours, indicating significant surface oxidation.

Preparation of Solutions 1. 0.16 M $NaBH_4$ in 0.1 M NaOH solution
   Weigh 0.6053 g of $NaBH_4$ solids and dissolve gradually into 100 mL 0.1 NaOH solution.

2. 0.1 M $FeCl_3 \cdot 6H_2O$ solution
   Weigh 2.7030 g $FeCl_3 \cdot 6H_2O$ and dissolve into 100 mL Mili-Q water.

Particle Analysis

Figure 1:
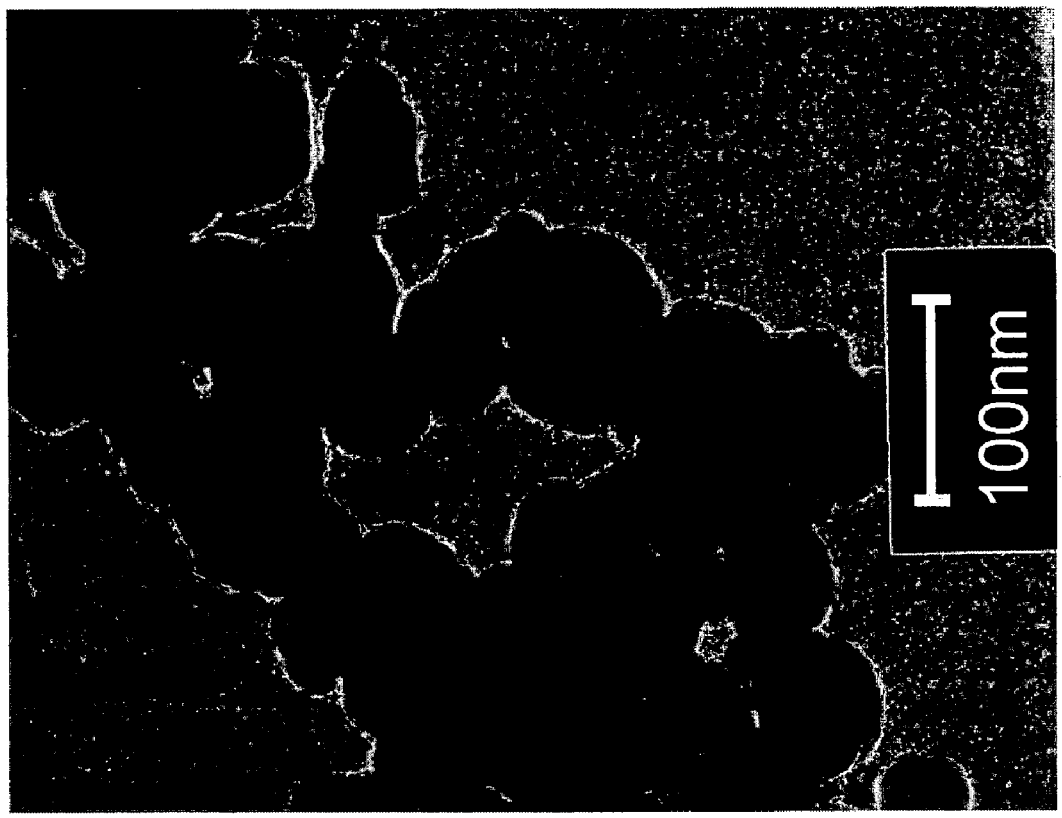
FIG. 1 is a Transmission Electron Microscope (TEM) image of freeze-dried ZVI particles manufactured using sodium borohydride reduction.

Analysis by SEM and later by TEM confirmed that the average primary particle size is approximately 50 nm (FIG. 1). The particles are substantially spherical and aggregated into chains. Together with BET gas adsorption measurements with $N_2$ (ASAP 2000, GA), the work suggests that the nano-sized ZVI particles produced in this Comparative Example are similar to those produced by other researchers (Table 1).

TABLE 1

| Properties of various ZVI particles | | |
|---|---|---|
| Surface area (m²/g) | Size (nm) | References |
| 33.5 | 1-100 | Zhang et al., Catalysis Today, 1998, 40, 387-395 |
| 31.4 | 1-200 | Choe et al., (2001) Rapid reductive destruction of hazardous organic compounds by nanoscale Fe0, 42, 367-372 |
| 27.8-31.8 | 1-200 | Comparative Example 1 |
| 0.063 | 75,000-150,000 | Choe et al., (2000) Kinetics of reductive denitrification by nanoscale zero-valent iron, 42, 367-372 (commercial grade) |
| 0.038 | 425,000-850,000 | Agrawal et al., Environ. Sci. Technol., 1996, 30, 153-160 (commercial grade) |

Figure 2A:
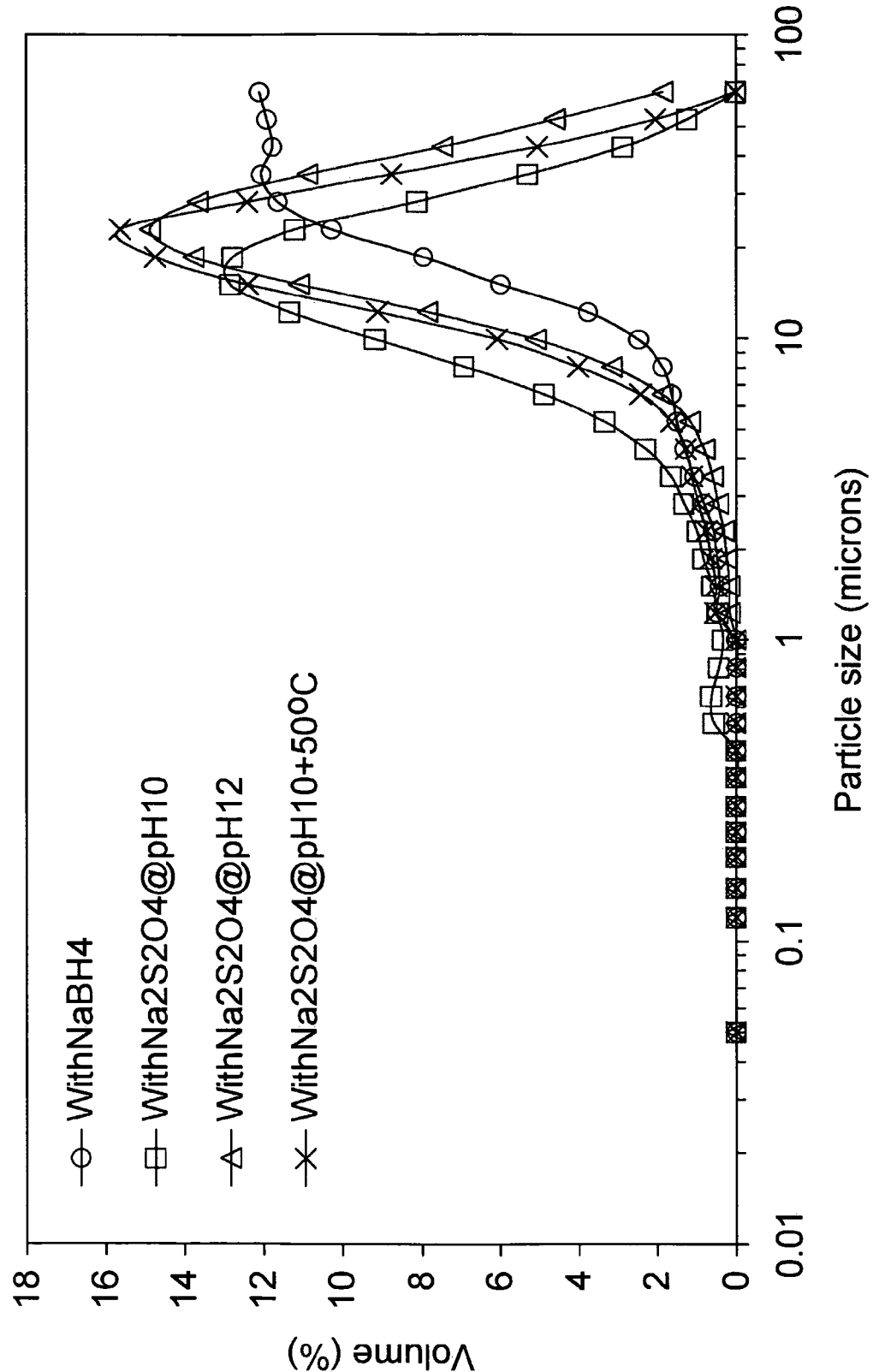
FIG. 2a shows ZVI particle size distributions for particles manufactured using sodium borohydride reduction using a Brookhaven Instrument (for particle sizes between 30 nm to 10 μm). Note that most of the particle aggregates are greater than 7 um.
Figure 2B:
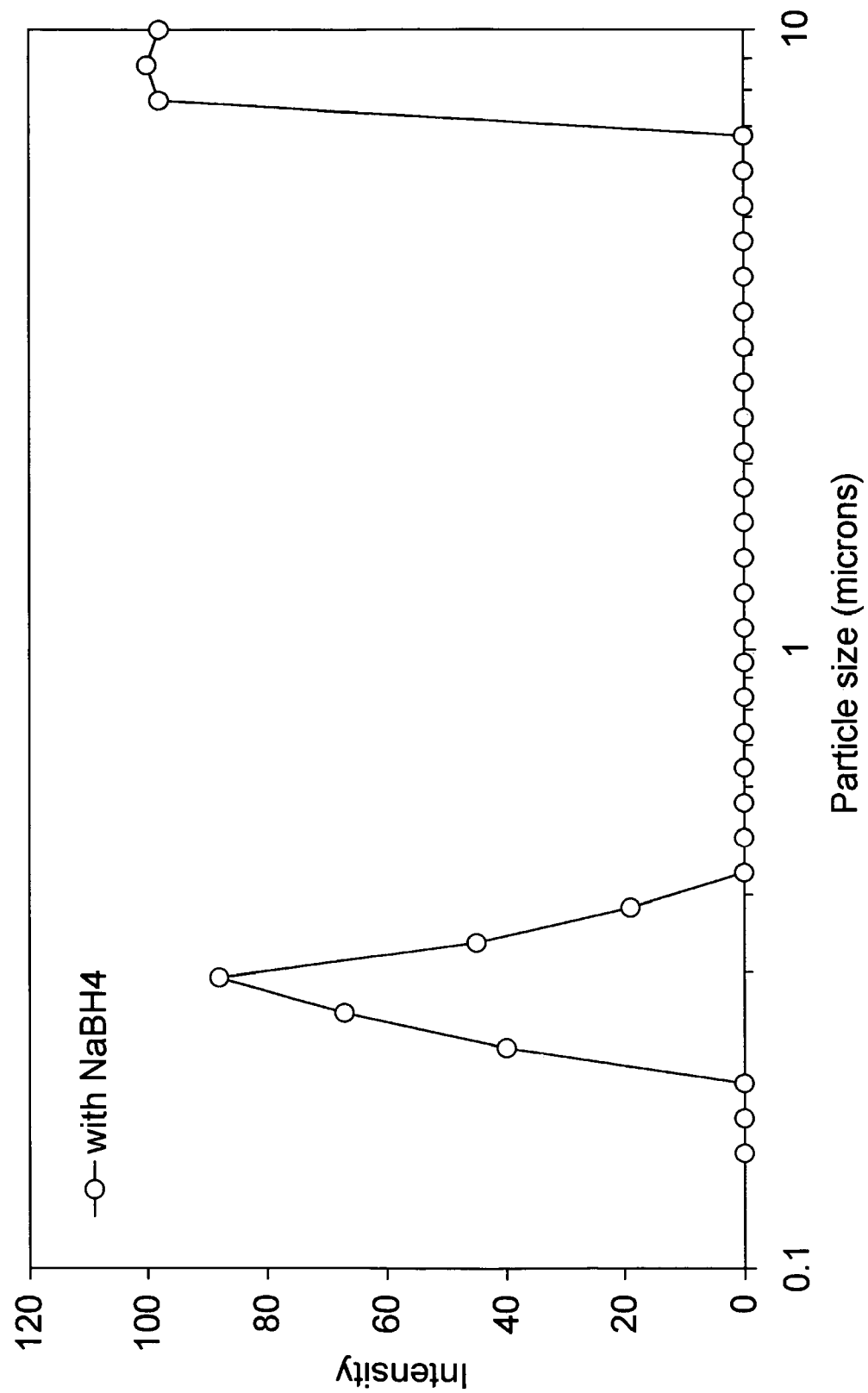
FIG. 2b shows ZVI particles size distributions for particles manufacture using sodium borohydride reduction and also using sodium dithionite reduction at different pH and temperatures using a Malvern Mastersizer E (for particle sizes between 100 nm and 100 μm). Note that the particles manufacture using sodium borohydride reduction have a larger average aggregate particle size than those sodium dithionite reduction.

Analysis using the ZetaPlus, Brookhaven Instrument for size measurement suggests that upon drying the ZVI particles tend to form larger chain-like aggregates (both using $N_2$ at 50° C. and freeze drying) (FIG. 2). These aggregates are approximately 0.5-1 μm in size.

Figure 3:
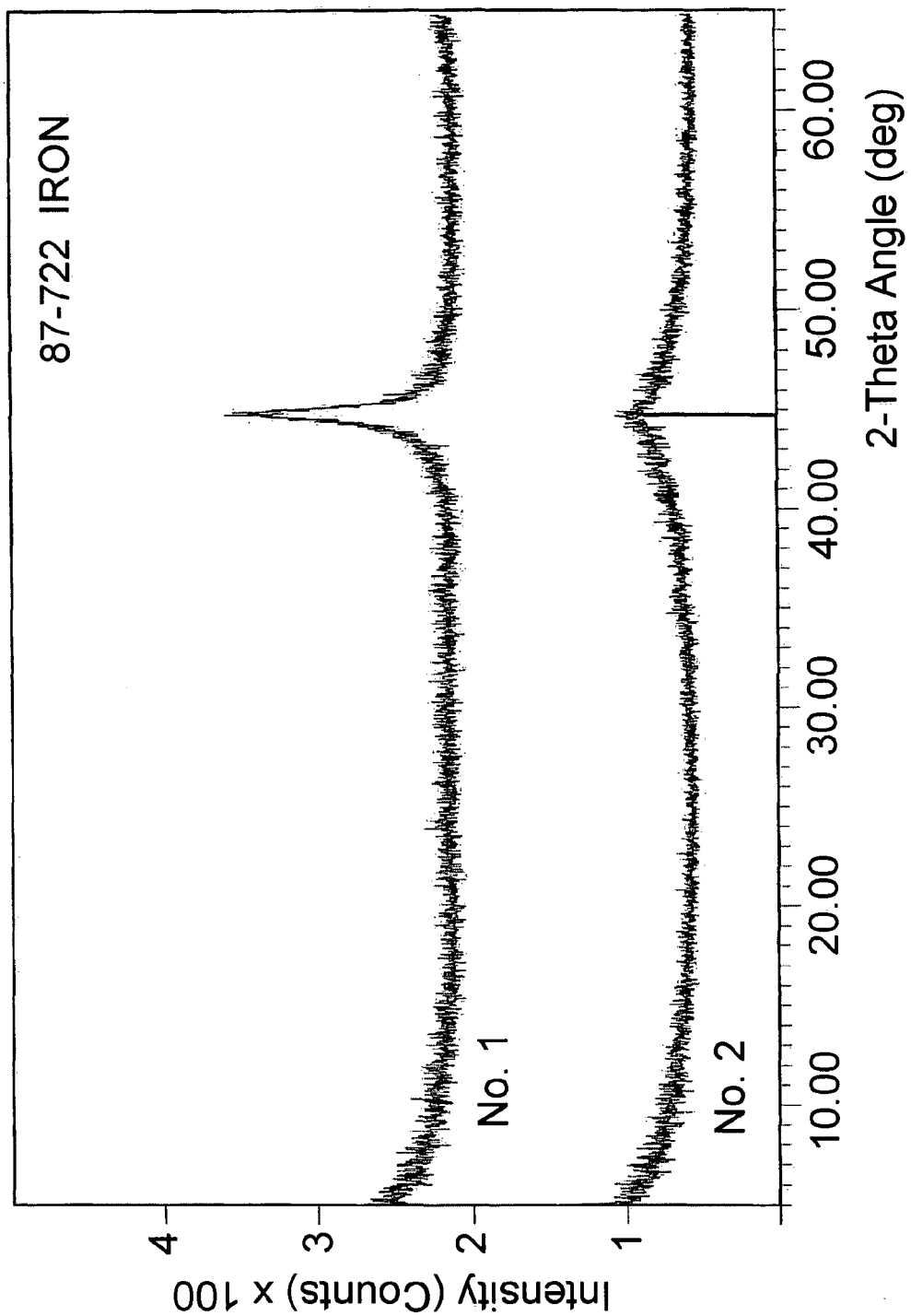
FIG. 3 shows XRD spectra of nano-sized $Fe^0$ particles manufactured using sodium borohydride and ferric chloride.
Figure 4:
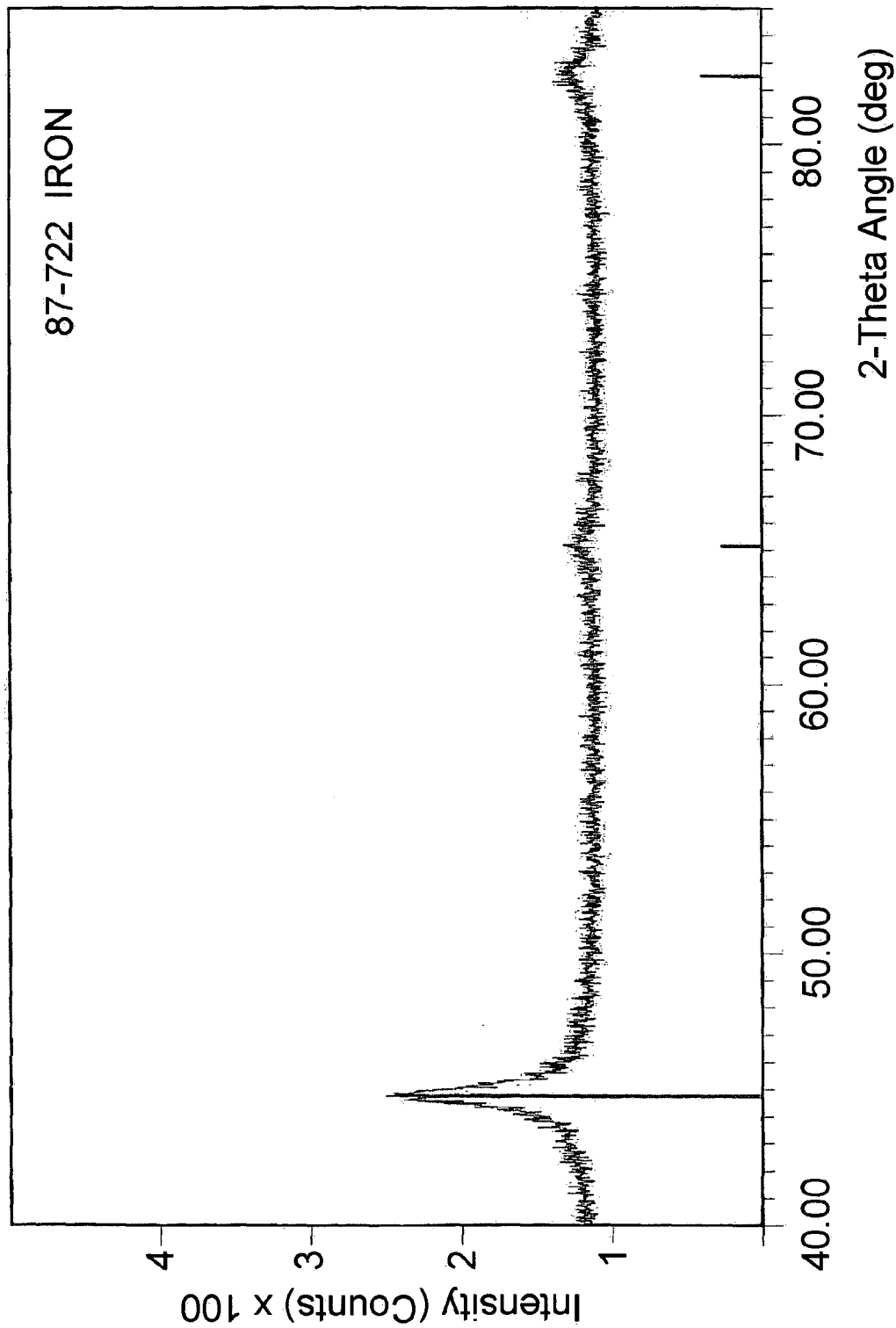
FIG. 4 shows more detailed XRD spectra of nano-sized $Fe^0$ particles manufactured using sodium borohydride and ferric chloride.

XRD analysis has confirmed that the nano-sized particles made using the sodium borohyride/$FeCl_2$ technique are elemental iron (FIGS. 3 and 4).

Example 1

Method for ZVI Synthesis Using Sodium Dithionite and Ferrous Chloride

Nanoscale ZVI particles are produced by adding 40 mL of 0.1 M $FeCl_2$ ($FeCl_2.4H_2O$, 99%, Sigma) aqueous solution dropwise to a 50 mL of 0.2 M $Na_2S_2O_4$ (85% purity, Sigma) aqueous solution at ambient temperature with magnetic stirring. NaOH is added to keep pH at or above 10. $Fe^{2+}$ is reduced and $Fe^0$ is precipitated according to the following reaction:

| Reaction | $E_H$ |
|---|---|
| $S_2O_4^{2-} + 4OH^- \rightarrow 2SO_3^{2-} + 2H_2O + 2e^-$ | +1.12 |
| $Fe^{2+} + 2e^- \rightarrow Fe_{(s)}$ | −0.44 |
| $S_2O_4^{2-} + Fe^{2+} + 4OH^- \rightarrow Fe_{(s)} + 2SO_3^{2-} + 2H_2O$ | +0.68 |

The first 5 minutes of the reaction was carried out under nitrogen gas and then the container was sealed for the rest of the reaction (4 h). The black nanoparticles are clearly visible and primarily produced within this first 5 minutes period. Dry metal particles are obtained by washing the wet precipitates with $10^{-4}$ M HCl solution and Milli-Q water (or with Milli-Q only) and drying using a vacuum drier for 2 days. Dry particles need to be stored under an inert atmosphere (e.g. argon or nitrogen) to prevent rapid oxidation.

Preparation of Solutions 1. 0.2 M $Na_2S_2O_4$ solution
   Weigh 4.1 g of 85% purity $Na_2S_2O_4$ solids and put it into 100 mL Mili-Q water gradually.

2. 0.1 M $FeCl_2$ solution
   Weigh 2.0 g $FeCl_2.4H_2O$ and dissolve it into 100 mL Mili-Q water.

Particle Analysis

Figure 5:
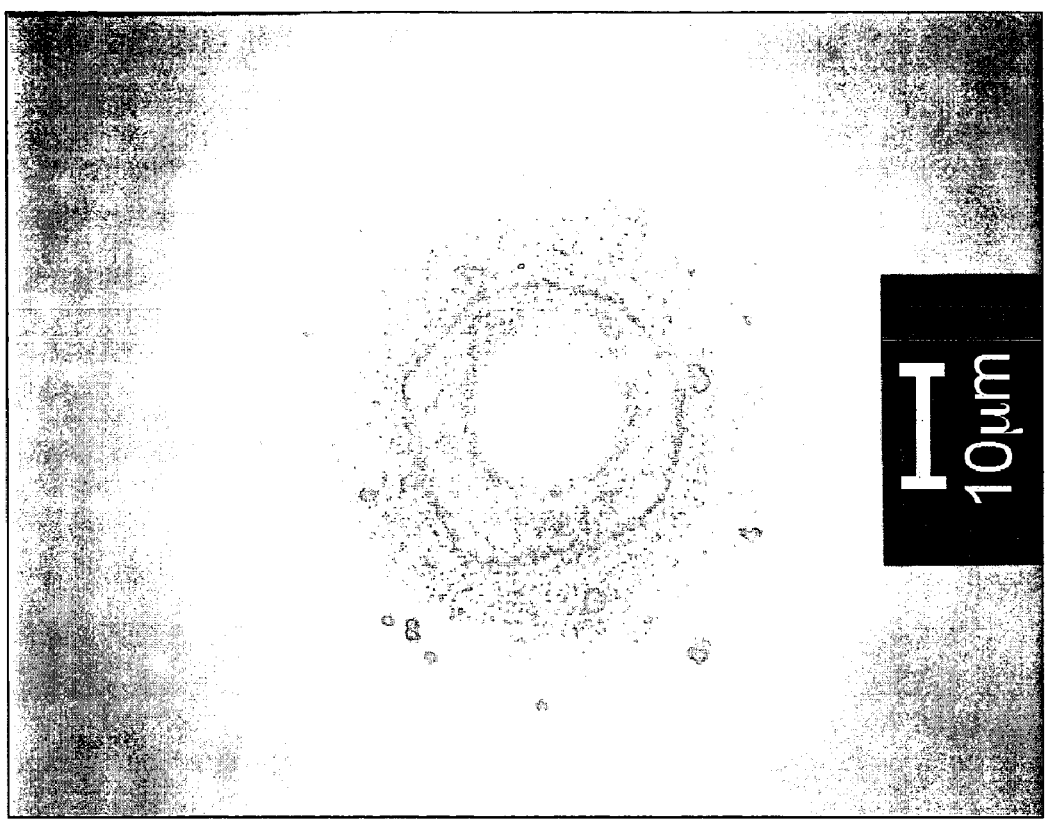
FIG. 5 shows the TEM diffraction pattern for the nano-sized $Fe^0$ particles manufactured using sodium borohydride and ferric chloride (scale bar=10 μm)
Figure 6:
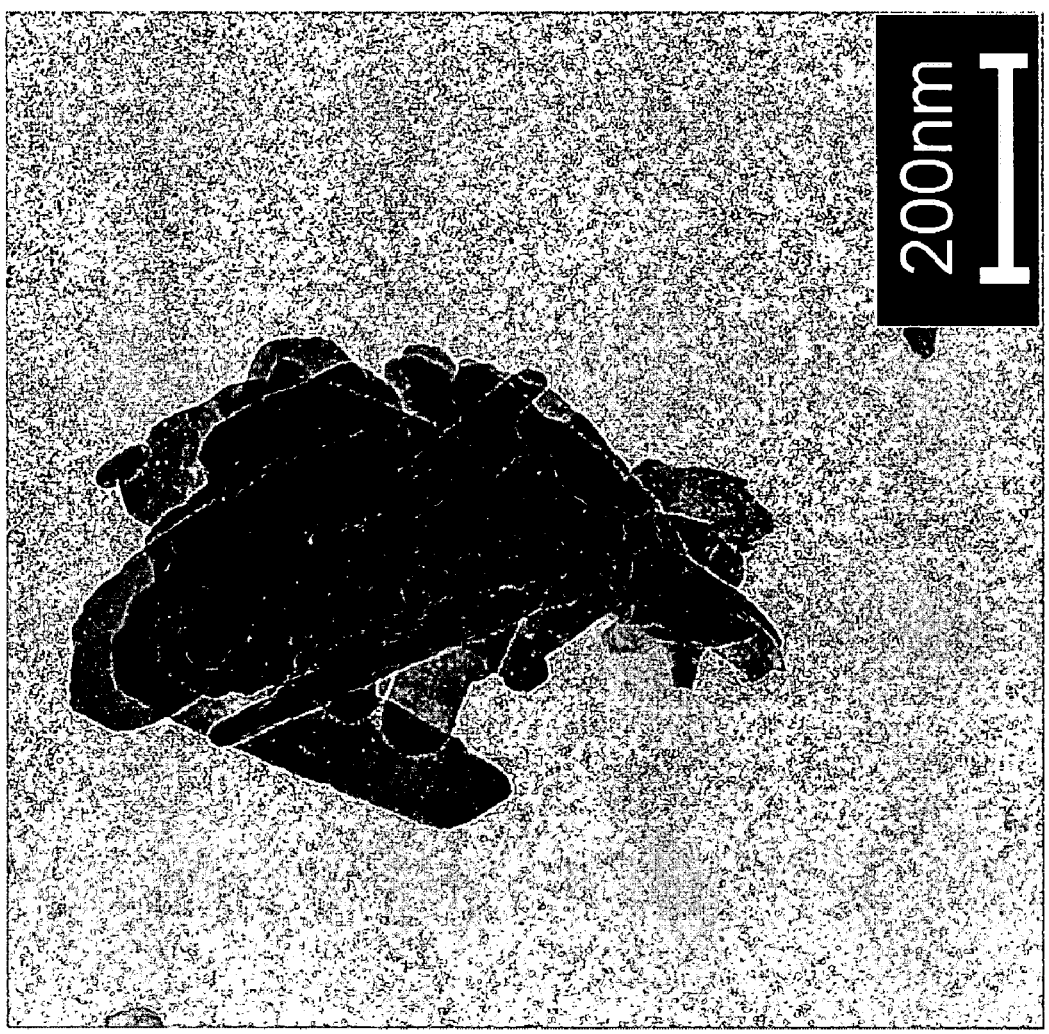
FIG. 6 shows nano-sized particles produced from $FeCl_2$ and sodium dithionite after freeze-drying (scale bar=200 nm).
Figure 7:
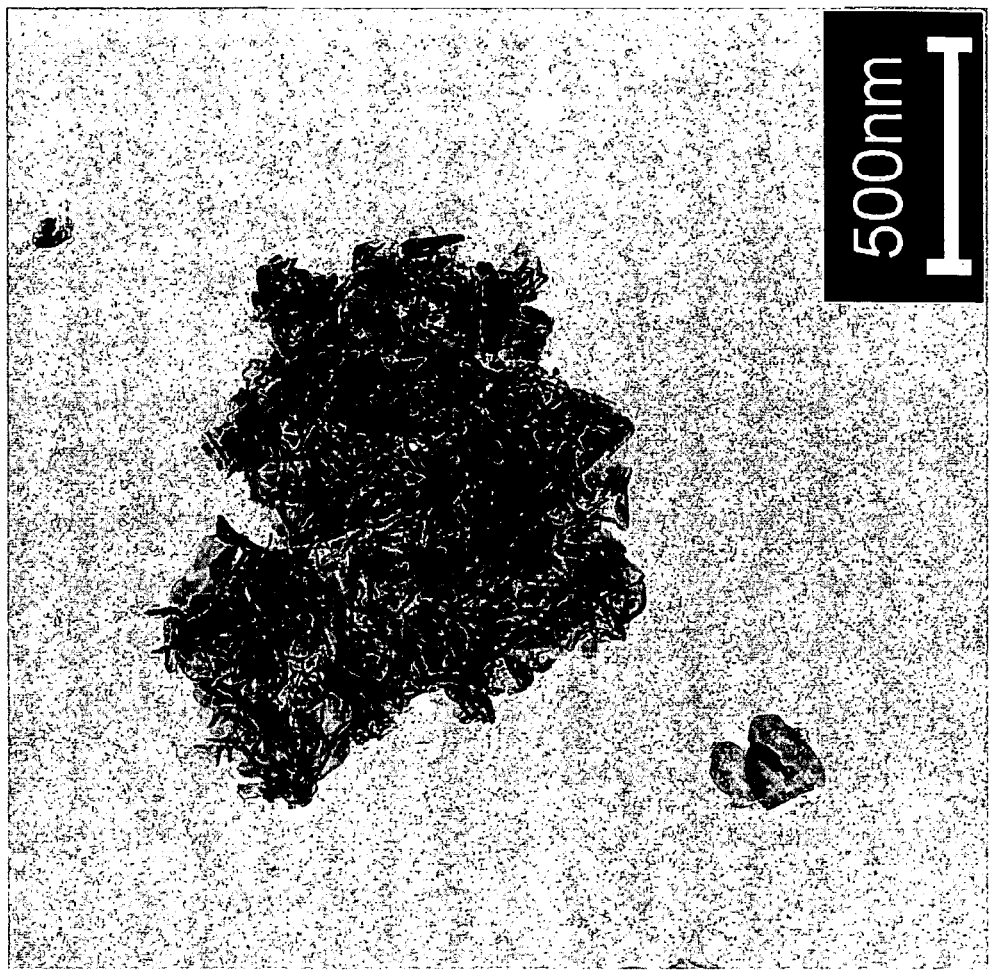
FIG. 7 shows larger aggregates of the nano-sized particles produced from $FeCl_2$ and sodium dithionite after freeze-drying (scale bar=500 nm).
Figure 8:
FIG. 8 shows an example of very small nano-sized particles within a larger aggregate produced from $FeCl_2$ and sodium dithionite after freeze-drying (scale bar=100 nm).
Figure 10:
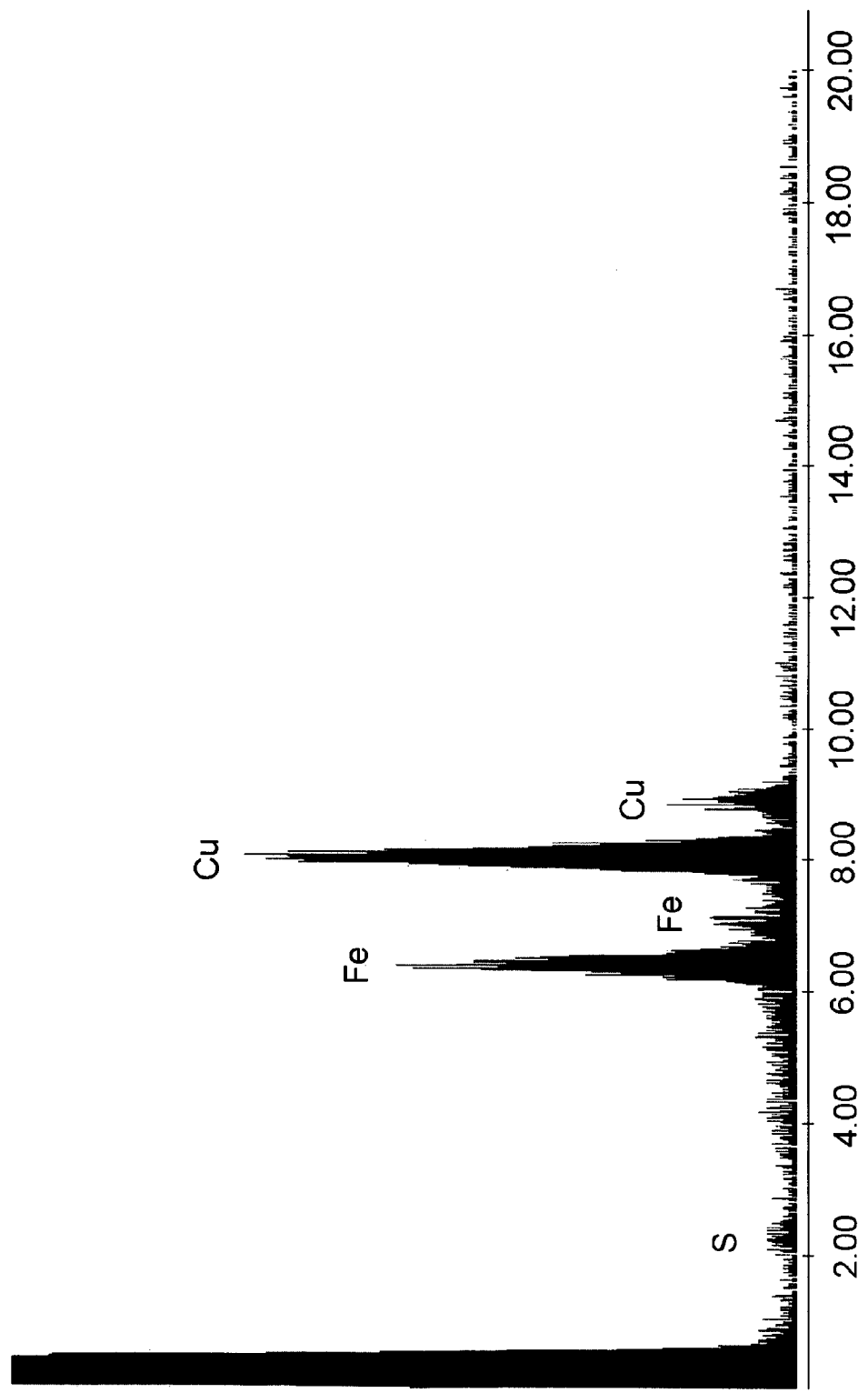
FIG. 10 shows TEM EDAX analysis of sample 1A. The copper present in the figure is interference from the copper coated sample grid.
Figure 11A:
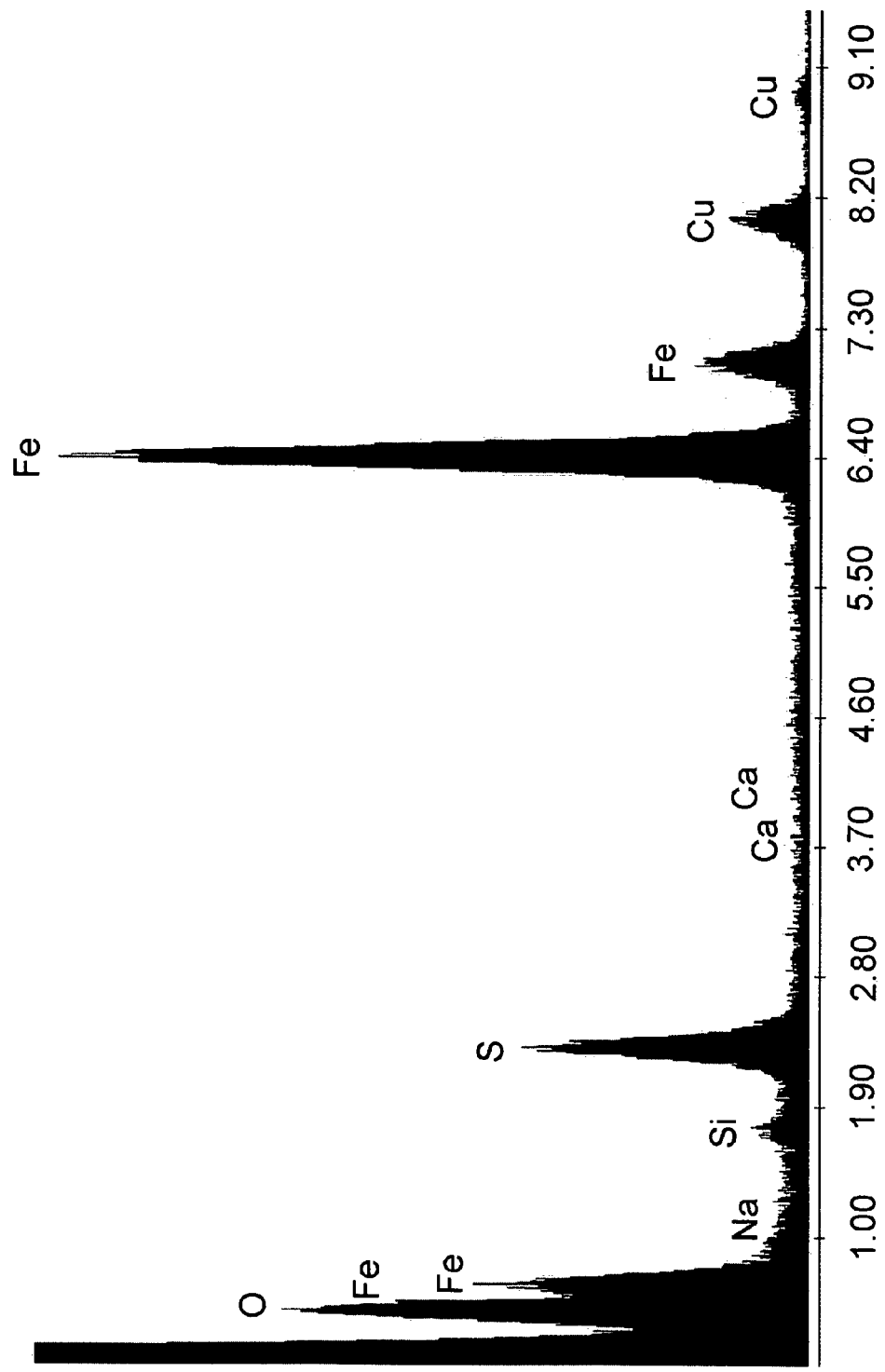
FIGS. 11a and 11b show TEM EDAX analysis of another sample produced from $FeCl_2$ and sodium dithionite which illustrates the differing Fe:S ratios within a platelet.
Figure 11B:
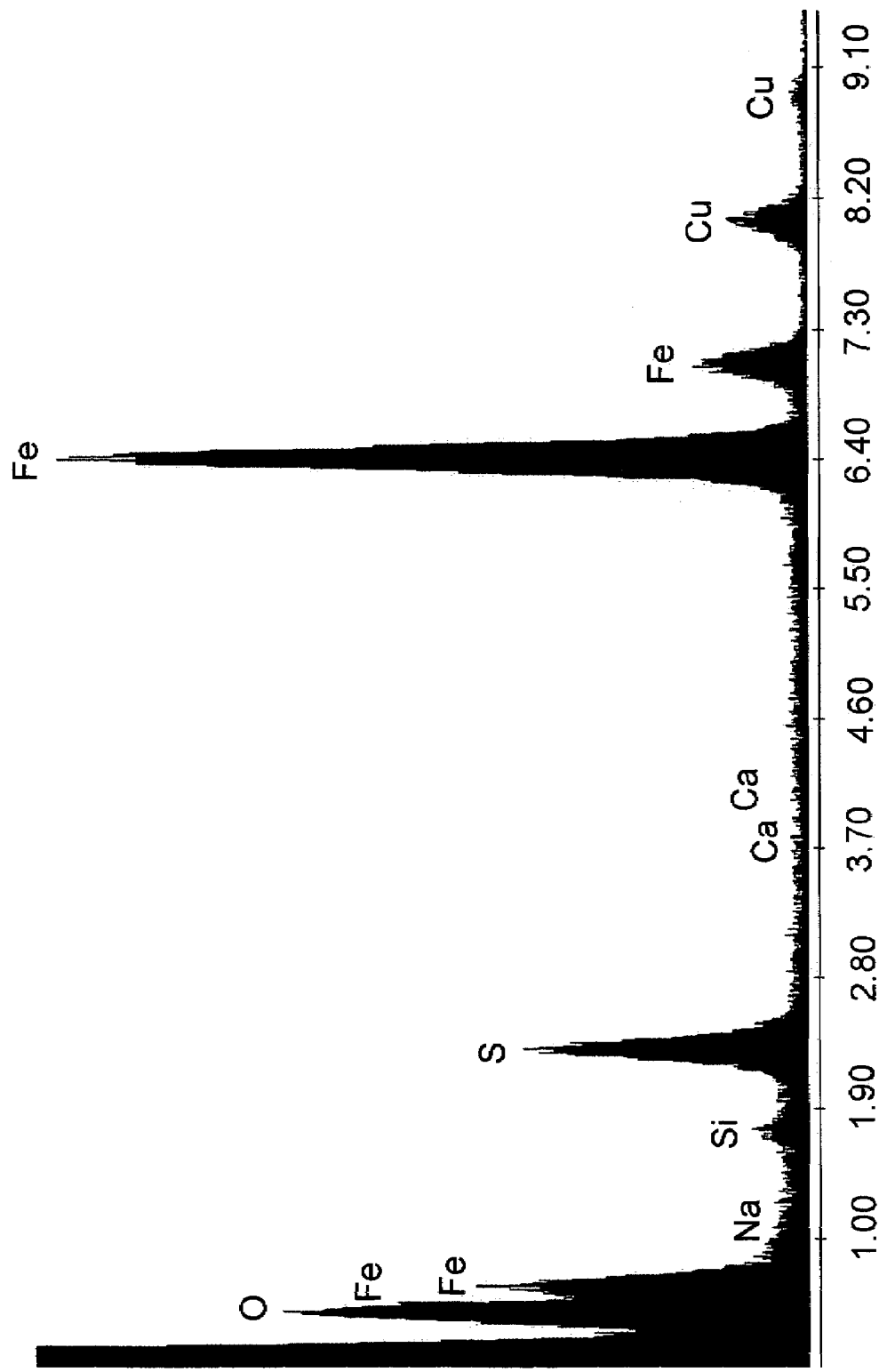
Figure 12:
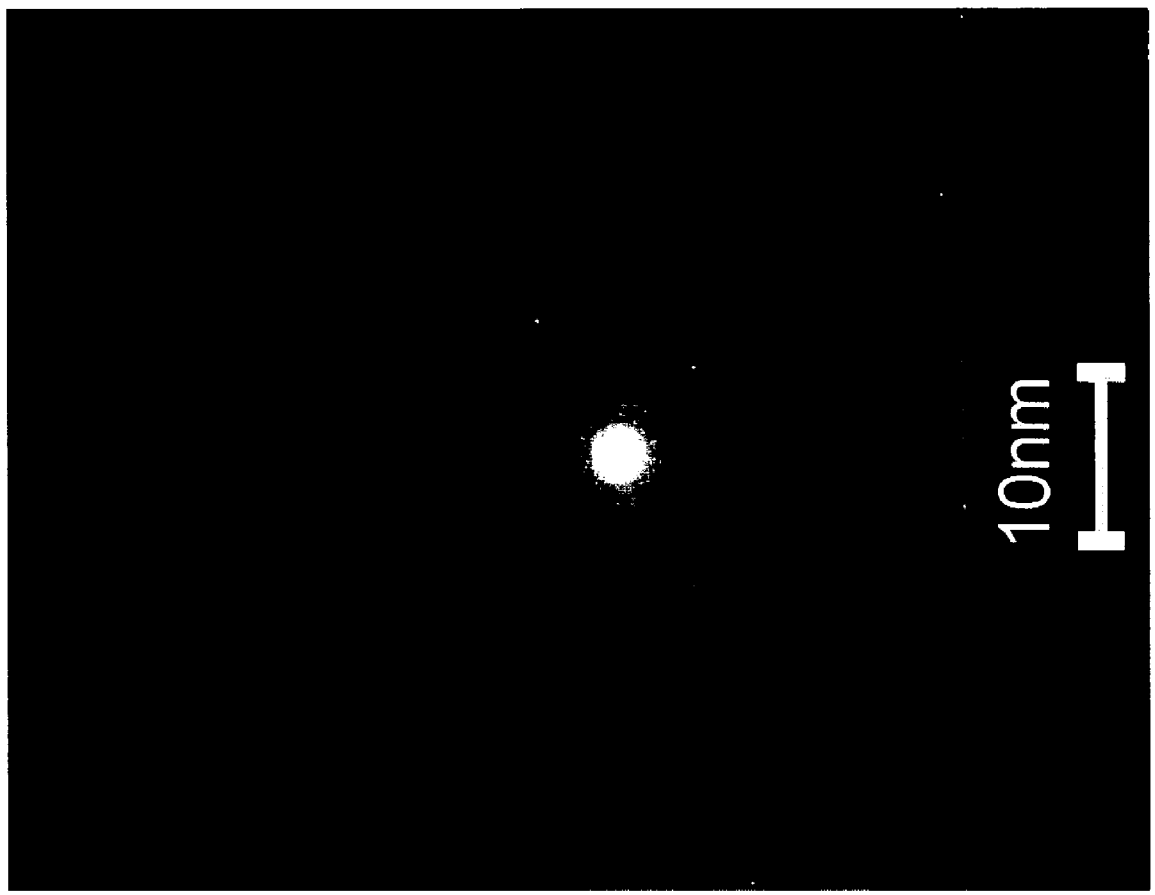
FIG. 12 shows the TEM diffraction pattern for the nano-sized particles manufactured using from $FeCl_2$ and sodium dithionite (scale bar=10 nm). The diffraction pattern is averaged and the presence of rings indicates that particles are definitely crystalline.

The particles are formed from small, thin, platelet-like crystals (FIG. 5) that appear to be a mixture of very small elemental iron particles imbedded in a sulfite hydrate crystal matrix. The particles are too thin and too readily oxidized to be analysed using conventional XRD analysis but elemental analysis shows the presence of sulfur in the larger particle aggregates (FIG. 9). TEM energy dispersive x-ray spectroscopy (EDAX) analysis further supports this assessment (FIG. 10) and indicates that the Fe:S ratio is not uniform throughout a platelet (FIGS. 11a and 11b). TEM diffraction analysis indicates the presence of two or more crystalline phases within the platelets over a small (10 nm) area (FIG. 12).

Performance Comparison

An aqueous suspension of particles prepared by the borohydride method (Comparative Example 1) and particles prepared by the dithionite method of the invention (Example 1) were added to respective aqueous solutions containing 30 ppm trichloroethylene. The concentration of trichloroethylene was measured over a period of 2 hours in the presence of atmospheric oxygen and the experiment repeated under a substantially inert nitrogen atmosphere. All results were compared against a control in which nitrogen gas was bubbled through the solution of trichloroethylene (no ZVI was added).

Figure 13:
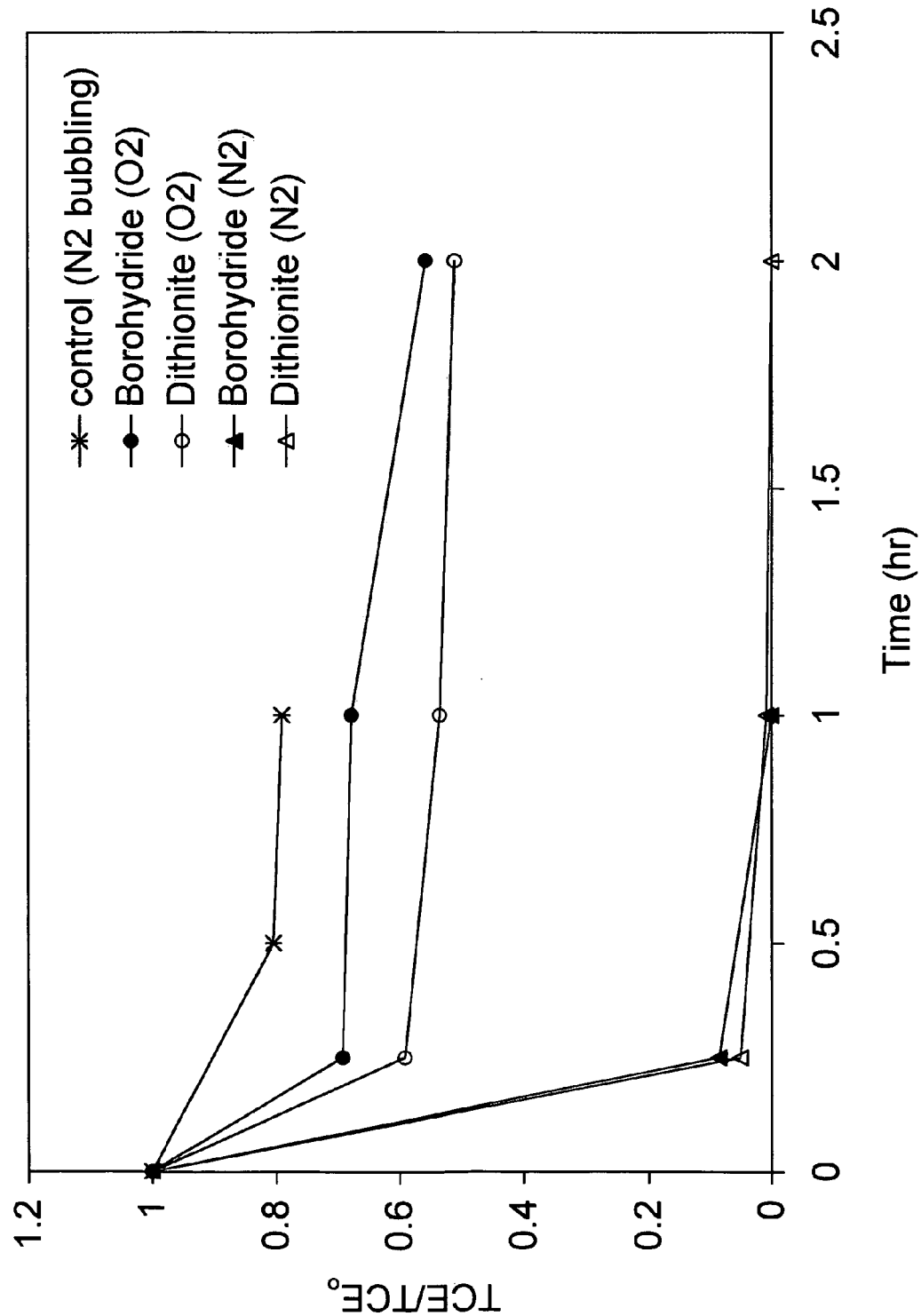
FIG. 13 shows a comparison of trichloroethylene (TCE) degradation performance using ZVI particles according to the present invention and prior art ZVI particles.

The results are shown in FIG. 13, where $C/C_0$ is the ratio of the experimental concentration of trichloroethylene to the initial concentration of trichloroethylene; $N_2$ indicates a substantially inert nitrogen atmosphere; and $O_2$ indicates the presence of dissolved atmospheric oxygen.

It can be seen from FIG. 13 that the ZVI particles produced according to the process of the present invention possess superior degradation properties compared with nanoscale ZVI particles produced using sodium borohydride reduction. Moreover, the particles of the present invention are significantly cheaper, easier and safer to produce than the nanoscale ZVI particles known in the prior art.

Example 2 pH, Atmosphere and Reductant Dependence of the Process of the Invention

Using solutions of metal cation and reductant salt prepared as described above, the following combinations, along with variations in atmosphere ("air" thus including atmospheric $O_2$ and $CO_2$, and "$N_2$" representing a substantially inert nitrogen atmosphere) and pH were tried under laboratory conditions. The column "ZVI" indicates whether ZVI was formed.

| Number | Reaction | Atmosphere | pH | ZVI |
|---|---|---|---|---|
| 1 | $FeCl_3 + Na_2S_2O_4$ | air | no control | — |
| 2 | $FeCl_3 + Na_2S_2O_4$ | air | 5 | — |
| 3 | $FeCl_3 + Na_2S_2O_4$ | air | 12 | — |
| 4 | $FeCl_3 + Na_2SO_3$ | air | 3 | — |
| 5 | $FeCl_3 + Na_2SO_3$ | $N_2$ | 3 | — |
| 6 | $FeCl_3 + Na_2SO_3$ | air | 9 | — |
| 7 | $FeCl_3 + Na_2SO_3$ | $N_2$ | 9 | — |
| 8 | $FeCl_3 + Na_2S_2O_4$ | air | 9 | — |
| 9 | $FeCl_3 + Na_2S_2O_4$ | $N_2$ | 9 | — |
| 10 | $FeSO_4 + Na_2SO_3$ | $N_2$ | 9 | — |
| 11 | $FeSO_4 + Na_2SO_3$ | $N_2$ | >12 | — |
| 12 | $FeCl_2 + Na_2SO_3$ | $N_2$ | >12 | — |
| 13 | $FeCl_2 + Na_2S_2O_4$ | air | 6-8 | — |
| 14 | $FeCl_2 + Na_2S_2O_4$ | air | 12 | — |
| 15 | $FeCl_2 + Na_2S_2O_4$ | $N_2$ | 3 | — |
| 16 | $FeCl_2 + Na_2S_2O_4$ | $N_2$ | 5 | — |
| 17 | $FeCl_2 + Na_2S_2O_4$ | $N_2$/300 ppm $CO_2$ | 12 | Yes |
| 18 | $FeSO_4 + Na_2S_2O_4$ | $N_2$/300 ppm $CO_2$ | 10 | Yes |
| 19 | $FeSO_4 + Na_2S_2O_4$ | $N_2$/300 ppm $CO_2$ | 12 | Yes |
| 20 | $FeCl_2 + Na_2S_2O_4$ | $N_2$ | 11-12 | Yes |
| 21 | $FeSO_4 + Na_2S_2O_4$ | $N_2$ | >12 | Yes |

What is claimed is:

1. A process for producing a nanoscale zero-valent metal, said process including reduction of a metal ion solution with a dithionite compound, wherein said reduction is carried out under alkaline conditions and under a substantially inert atmosphere.

2. The process of claim 1, wherein said metal ion is selected from the group consisting of: iron, nickel, zinc, tin, copper, silver, gold, lead, cadmium, mercury, cobalt, molybdenum, chromium, platinum, palladium and phosphorus.

3. The process of claim 1, wherein said metal ion is selected from the group consisting of: iron, copper, gold, platinum, palladium and silver.

4. The process of claim 1, wherein said metal ion is selected from the group consisting of: iron, copper and silver.

5. The process of claim 1, wherein said metal ion is iron.

6. The process of claim 5, wherein said metal ion solution is a ferrous (Fe II) solution.

7. The process of claim 6, wherein said ferrous solution is an aqueous solution.

8. The process of claim 6, wherein said ferrous solution is an aqueous solution comprising a ferrous salt selected from the group consisting of $FeSO_4$, $FeCl_2$, $FeBr_2$, $FeI_2$, $Fe(NO_3)_2$, $FeCO_3$, $Fe_3(PO_4)_2$ and a mixture of any thereof.

9. The process of claim 6, wherein said ferrous solution is an aqueous solution of $FeSO_4$ or $FeCl_2$.

10. The process of claim 1, wherein said dithionite compound is a metal salt of dithionite.

11. The process of claim 1, wherein said dithionite compound is a compound selected from $Na_2S_2O_4$, $Li_2S_2O_4$, $K_2S_2O_4$, $MgS_2O_4$, $CaS_2O_4$ or mixtures thereof.

12. The process of claim 1, wherein said dithionite compound is $Na_2S_2O_4$.

13. The process of claim 1, wherein said metal ion solution has a pH in the range of about pH 9 to about pH 11.

14. The process of claim 1, wherein said metal ion solution has a pH of about pH 10.

15. The process of claim 1, wherein said alkaline conditions are provided by including a hydroxide compound in said metal ion solution.

16. The process of claim 15, wherein said hydroxide compound is selected from the group consisting of LiOH, NaOH, KOH, $Mg(OH)_2$, $Ca(OH)_2$ and a mixture of any thereof.

17. The process of claim 15, wherein said hydroxide compound is NaOH.

18. The process of claim 1, wherein said process is carried out under a substantially inert atmosphere.

19. The process of claim 18, wherein said substantially inert atmosphere is provided by nitrogen, argon or a mixture thereof.

20. A nanoscale zero-valent metal obtained by a process according to claim 1.

21. The nanoscale zero-valent metal according to claim 20, which is nanoscale zero-valent iron (ZVI).

22. The nanoscale zero-valent metal according to claim 20, having an average primary particle size of about 0.5 nm to about 3000 nm.

23. The nanoscale zero-valent metal according to claim 20, having an average aggregate particle size of about 0.1 μm to about 100 μm.

24. The nanoscale zero-valent metal of claim 20 including nanoscale particles of crystalline platelets, each said crystalline platelet including said zero-valent metal.

25. The nanoscale zero-valent metal of claim 24, wherein said crystalline platelets include metal particles imbedded in a sulfite hydrate crystal matrix.

26. The nanoscale zero-valent metal according to claim 24, which is iron.

27. The nanoscale zero-valent metal according to claim 24, wherein said nanoscale particles of crystalline platelets have an average primary particle size in the range of about 0.1 to about 3000 nm.

28. The zero-valent metal according to claim 20, which is coated with a layer of palladium or platinum.

29. A process for treating a material contaminated with an organic contaminant, said process including the step of contacting the material with a zero-valent metal according to claim 20.

30. The process of claim 29, wherein said organic contaminant is a halogenated organic compound (HOC), a nitroaromatic compound, or a mixture thereof.

31. The process of claim 29, wherein said zero-valent metal is in the form of a colloidal suspension.

32. The process of claim 29, wherein said contaminated material is contaminated water.

* * * * *